3,418,290
SULFONATED CAPROLACTONES AND POLYMERIZATION WITH 2,2-DIALKYL-3-PROPIOLACTONES
Adriaan Bantjes, Wilmington, Del., assignor to E. I. du Pont de Nemours and Company, Wilmington, Del., a corporation of Delaware
No Drawing. Filed Oct. 18, 1965, Ser. No. 497,468
10 Claims. (Cl. 260—78.3)

ABSTRACT OF THE DISCLOSURE 2-sulfo-6-caprolactone (I) and lower alkyl derivatives thereof, (Ia),

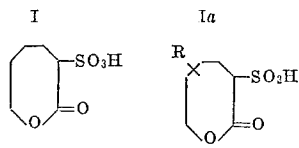

wherein R is lower alkyl, are disclosed. These compounds in the form of their metallic salts and esters are useful for preparation of copolyesters of 2,2-disubstituted propiolactones exhibiting a high degree of affinity for basic dyes.

---

This invention relates to novel lactones, and to novel copolyesters thereof with 2,2-dialkyl-3-propiolactones.

Fibers of polypivololactone and other polymeric 2,2-dikalyl-3-propiolactones are valuable for the production of various textile materials including garments requiring only minimum care. However, the fibers have a relatively low affinity for most dyes, a circumstance which severely restricts the suitability of the fibers for use in the production of colored fabrics.

In accordance with this invention, it has been found that 2-sulfo-6-caprolactone (I) and lower alkyl derivatives thereof, (Ia),

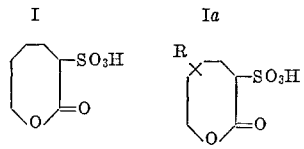

wherein R is lower alkyl, are readily prepared. In the form of their metallic salts and esters, these lactones have excellent utility in the preparation of copolyesters of 2,2-disubstituted propiolactones exhibiting a high degree of affinity for the class of basic dyes, unlike the corresponding homopolymers of the 2,2-distubstituted propiolactones, which possess little or no affinity for such dyes.

An alternative name which may be given to 2-sulfo-6-caprolactone is 6-caprolactone-2-sulfonic acid, and the latter form is especially adaptable to naming its esters and salts, e.g. sodium 6-caprolactone-2-sulfonate.

A useful method for preparing the novel lactones comprises reaction of 6-caprolactone (II) with sulfur trioxide at a temperature in the range of −30° to 50° C., preferably 0° to 10° C.:

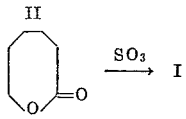

Similarly, the lower alkyl derivatives of II may be reacted with sulfur trioxide to yield Ia. Chloroform is an advantageous solvent in which the reaction may be carried out. Other solvents which may be employed include dioxane, perchloroethylene, and liquid sulfur dioxide.

2-sulfo-6-caprolactones are converted into metallic 6-caprolactone-2-sulfonate salts by neutralization with the corresponding metallic hydroxide:

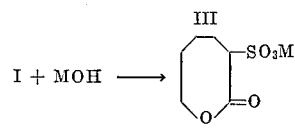

or Ia+MOH→IIIa, the lower alkyl derivatives of III, wherein M is the fraction of an atom of metal equal to the reciprocal of its valence. In cases in which the metallic hydroxide is highly insoluble in water, the desired metallic salt may be prepared by agitating an aqueous solution of the 2-sulfo-6-caprolactone with a slurry of the hydroxide or the corresponding carbonate. An aqueous solution of the acetate of the metal may also be reacted with a solution of the sulfo-caprolactone, followed by precipitation of the metal salt or stripping off of a portion of the aqueous solution with accompanying removal of the acetic acid formed in the reaction. Typical salts which may be formed include not only the sodium 6-caprolactone-2-sulfonate but also the potassium, lithium, magnesium, calcium, barium, zinc, nickel, lead, and lanthanum 6-caprolactone-2-sulfonates. Reaction of the 2-sulfo-6-caprolactone with diazomethane yields the corresponding methyl ester. Esters may also be prepared by the Bayer-Villiger conversion of the corresponding cyclohexanone-2-sulfonate ester (IV or IVa) with perfluoroperacetic acid:

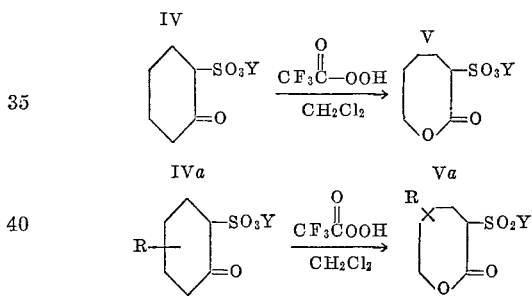

wherein R is lower alkyl and Y is an alkyl or aryl radical. Typical esters which may be formed include methyl 6-caprolactone-2-sulfonate as well as the corresponding ethyl, n-propyl, isopropyl, butyl, decyl, stearyl, phenyl, and p-chlorophenyl 6-caprolactone-2-sulfonates.

The following examples illustrate the preparation of the novel sulfocaprolactones.

EXAMPLE 1.—2-Sulfo-6-caprolactone

A carefully dried flask is charged with a solution of 18.5 g. of 6-caprolactone in 16.0 g. of dry chloroform. The flask is blanketed with nitrogen and cooled in a mixture of ice and salt. The solution is stirred continuously while 4.3 ml. of sulfur trioxide (stabilized sulfur trioxide available commercially from Allied Chemical and Dye Corporation as "Sulfan B") is added slowly by syringe. The solution initially turns deep purple and a white sludge is formed, but over the course of several hours the mixture becomes a pale orange solution. Stripping off the chloroform from a small sample of the mixture yields the product, 2-sulfo-6-caprolactone.

EXAMPLE 2.—Sodium 6-caprolactone-sulfonate

The mixture produced as described in Example 1 is poured into 200 ml. of distilled water and the chloroform layer is removed. The aqueous portion is carefully neutralized with 2 N sodium hydroxide solution until the pH reaches 6.5–7.0. The water is removed in a rotary evaporator, leaving a pale yellow residue, which is then washed with 400 ml. of a mixture of equal parts by volume of methanol and ethyl ether. The remaining product is a pale white powder of very hygroscopic nature, sodium 6-caprolactone-2-sulfonate, having a melting point of 250° C. to 257° C.

*Analytical data.*—Calculated for $C_6H_9O_5SNa$: C, 33.3; H, 4.2; S, 14.8; Na, 10.6%. Found: C, 35.8; H, 4.9; S, 10.26; Na, 12.2%.

EXAMPLE 3.—Methyl 6-caprolactone-2-sulfonate

To a stirred solution of 0.5 mol of diazomethane in 1.25 l. of dry diethyl ether (prepared by the procedure of J. A. Moore and D. E. Reed in "Organic Synthesis," vol. 41, p. 16) is added 0.375 mol of 2-sulfo-6-caprolactone. The yellow color of the diazomethane fades rapidly on addition. The ether layer, after separation and evaporation, yields a pale yellow liquid product of lower viscosity than 2-sulfo-6-caprolactone. The product, methyl 6-caprolactone-2-sulfonate, is characterized by its infrared absorption spectrum, which exhibits methyl sulfonate bonds at 7.32$\mu$ and 10.15$\mu$.

*Analytical data.*—Calculated for $C_7H_{12}O_5S$. Molecular weight: 208; C, 40.4%; H, 5.8%; O, 38.4%. Found: Molecular weight: 216; C, 42.4%; H, 6.4%; O, 39.0%.

EXAMPLE 4.—4-Methyl-2-sulfo-6-caprolactone

A flask containing 12.8 g. of 4-methyl-6-caprolactone in 15 ml. of dry chloroform is cooled to 0° C. and 2.7 ml. of sulfur trioxide in 10 ml. of dry chloroform is added slowly with stirring. Upon standing overnight at room temperature, the solution turns pale yellow. The chloroform is evaporated off, yielding the product, 4-methyl-2-sulfo-6-caprolactone.

EXAMPLE 5.—Sodium 4-methyl-6-caprolactone-2-sulfonate

The 4-methyl-2-sulfo-6-caprolactone prepared as described in Example 4 is dissolved in 150 ml. of water and neutralized with aqueous sodium hydroxide. Upon evaporation, 17.0 g. of the product, sodium 4-methyl-6-caprolactone-2-sulfonate, is obtained. The melting point of the product is 235° C.

The novel caprolactonesulfonate salts or esters of Formulas III, IIIa, V, and Va are readily copolymerized with 2,2-dialkyl-3-propiolactones of the formula

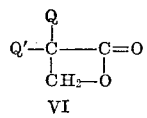

VI wherein Q and Q′ are the same or different alkyl radicals containing from 1 to 4 carbon atoms which may optionally be joined by a carbon-to-carbon bond to form an alicyclic ring. Typical 2,2-dialkyl-3-propiolactones with which the caprolactonesulfonate salts or esters of the invention may be copolymerized include pivalolactone (Q=Q′—CH$_3$), 2,2-diethyl-3-propiolactone (Q=Q′=CH$_2$CH$_3$), 2-methyl-2-ethyl-3-propiolactone (Q=CH$_3$, Q′=CH$_2$CH$_3$), 2,2-dipropyl-3-propiolactone (Q=Q′=CH$_2$CH$_2$CH$_3$), 2,2-dibutyl-3-propiolactone (Q=Q′=CH$_2$CH$_2$CH$_2$CH$_3$), and 2,2-pentamethylene-3-propiolactone (Q+Q′=CH$_2$CH$_2$CH$_2$CH$_2$CH$_2$).

The novel copolyesters so formed are characterized as linear polymers consisting of a succession of recurring ester structural units, from about 90 to about 99.5% of said ester structural units being radicals of the formula

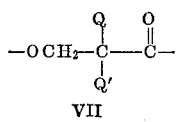

VII wherein Q and Q′ are as defined above and from about 10 to 0.5% of said ester structural units consisting essentially of radicals of the formula

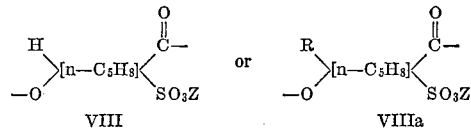

wherein Z is M or Y, the carbonyl and oxy groups are attached at opposite ends of the $C_5H_8$ radical, and the —SO$_3$Z group is attached to the same carbon atom as the carbonyl group. The prefix, n—, denotes that the $C_5H_8$ radical is a straight chain radical, in accordance with conventional usage, and R is lower alkyl which, of course, may be attached to any carbon of the chain.

The homopolymer prepared by the polymerization of 2,2-dialkyl-3-propiolactone is designated as poly(oxycarbonyl-1,1-dialkyldimethylene). It may also be named simply as poly(2,2-dialkyl-3-propiolactone). Other alternative names include multi-(oxycarbonyl - 1,1 - dialkyldimethylene) and poly(2,2-dialkylhydracrylic acid). The polymer in which Q=Q′=CH$_3$ is designated as poly-(oxycarbonyl-1,1-dimethyldimethylene), and it is also known by alternative names such as poly(pivalolactone) and poly-(hydroxypivalic acid). This polyester is readily prepared by the polymerization of pivalolactone, the intramolecular ester of hydroxypivalic acid, as disclosed by Reynolds and Vickers in their British Patent No. 766,347; or by the polymerization of hydroxypivalic acid as disclosed by Alderson in his U.S. Patent No. 2,658,055. The preparation of poly(oxycarbonyl - 1-methyl - 1-ethyldimethylene), poly(oxycarbonyl - 1,1-diethyldimethylene), and other polyesters of this kind are described by Etienne and Fisher in their French Patent No. 1,231,163.

The novel copolyesters of the invention are advantageously prepared by polymerization of the lactones in the same manner as the corresponding homopolyesters, incorporating the appropriate amount of the lactone of Formulas III, IIIa, IV, and IVa. Copolymeric compositions are designated herein by listing each of the respective ester structural repeating units, followed by a list of the mol percentage values for each of the units. For instance, a copolyester comprised of 95% of the recurring structural units derived from pivalolactone and 5% of the recurring structural units derived from sodium 6-caprolactone-2-sulfonate is designated as poly[oxycarbonyl-1,1-dimethyldimethylene/oxycarbonyl - 1-(sodium sulfo)-pentamethylene] (95/5).

In the examples below, the term "inherent viscosity" is defined as the polymer property determined in accordance with the following relationship:

$$\eta_{inh} = \frac{\ln \eta_{rel}}{c}$$

wherein the relative viscosity, $\eta_{rel}$, is calculated by dividing the flow time in a capillary viscometer of a dilute solution of the polymer by the flow time for the pure solvent, trifluoroacetic acid. The concentration (c) used in the examples is 0.5 gram of polymer per 100 ml. of solution. An inherent viscosity of at least about 0.5 is desired for the polymers employed in this invention to be used in films. For fiber applications an inherent viscosity of at least about 0.75 is desirable.

EXAMPLE 6

Copolyesters of pivalolactone and sodium 6-caprolactone-2-sulfonate

Seventy-five (75) g. (0.75 mol) of pivalolactone is introduced into a large, wide-mounthed test tube blanketed by an atmosphere of nitrogen, after which 4.0 g. (0.0185 mol) of finely powdered, dry sodium 6-caprolactone-2-sulfonate is added. Twelve drops of a 1.0N solution of tetrabutylammonium hydroxide in methanol is added, and the mixture is agitated in a mechanical shaker. An exothermic polymerization reaction takes place, after which the mixture is allowed to cool. The product, poly[oxycarbonyl - 1,1 - dimethyldimethylene/oxycarbonyl-1-(sodium sulfo)pentamethylene] (98.5/1.5), is ground up, thoroughly washed with water, and dried. It has an inherent viscosity of 1.75 and a crystalline melting point of 234° C.

The copolymer is press-spun at 260° C. through an orifice 0.305 mm. (12 mils) in diameter, the resulting extruded filament being passed into water and wound at 535–623 meters/min. (587–683 y.p.m.). The filament is annealed at 180° C. for twelve hours, after which it is boiled off by immersion in boiling water for 30 minutes. The filament has a tenacity of 4.6 g.p.d., an elongation of 84%, an initial modulus of 25 g.p.d., a work recovery at 5% elongation of 81%, and a tensile recovery at 5% elongation of 92%.

The fiber prepared as described above is dyed to a deep shade of blue with the basic dye identified by Colour Index No. 51,004. The dyeing step is carried out at 95° C. for 1 hour, employing 1 g. of the fiber and 40 ml. of the dyebath comprising 1 ml. of 1% acetic acid, 2 ml. of a 1% solution of a non-ionic detergent comprising a sulfonated fatty alcohol-ethylene oxide condensate, 4 ml. of 1% dye solution, and distilled water to bring the volume to 40 ml. A control fiber of unmodified poly(oxycarbonyl-1,1-dimethyldimethylene), prepared in general accordance with the procedure described above but omitting the sodium 6-caprolactone-2-sulfonate, adsorbs only a faint tint when dyed with the same dye under the same conditions; and such dye as is adsorbed is readily removed again when the fabric is scoured.

In a similar experiment, 45 g. (0.45 mol) of pivalolactone and 5 g. (0.023 mol) of dry sodium 6-caprolactone-2-sulfonate are reacted in the presence of tetrabutylammonium hydroxide initiator to produce poly[oxycarbonyl-1,1 - dimethyldimethylene/oxycarbonyl-1-(sodium sulfo)-pentamethylene] (97.5/2.5), from which fibers are formed. Fabrics made of the fibers dye to a deep shade of red with the basic dye of Example 2 of U.S. Patent 2,734,901.

EXAMPLE 7

Copolyester of pivalolactone and sodium 4-methyl-6-caprolactone-2-sulfonate

Following the general procedure of Example 6, 20 g. (0.2 mol) of pivalolactone and 1 g. (0.044 mol) of sodium 4 - methyl - 6-caprolactone-2-sulfonate are reacted in the presence of tetrabutylammonium hydroxide initiator to produce poly[oxycarbonyl-1,1-dimethyldimethylene/oxycarbonyl - 1 - (sodium sulfo)-3-methylpentamethylene] (98.4/1.6), from which films are formed which dye to a deep shade of red with the basic dye of Example 2 of U.S. Patent 2,734,901.

The fact that the 6-caprolactone-2-sulfonate salts copolymerize readily with pivalolactone to give dyeable polymers is quite unexpected, since 4 - butyrolactone - 2-sulfonate salts fail to coplymerize with pivalolactone and the resulting polypivalolactone is unmodified and undyeable with basic dyes as evidenced by the following example.

EXAMPLE 8.—(Comparative Example)

Attempted copolymerization of pivalolactone and sodium 4-butyrolactone-2-sulfonate Following the general procedures of Example 6, 50 g. (0.5 mol) of pivalolactone and 4 g. (0.0212 mol) of sodium 4-butyrolactone-2-sulfonate, prepared as described by Krzikalla et al. in German Patent No. 800,410, are mixed and tetrabutylammonium hydroxide initiator is added. An exothermic polymerization reaction takes place. However, the washed product contains no sulfur and resembles polypivalolactone homopolymer in that it is substantially undyeable with basic dyes.

I claim:

1. A compound of the group consisting of

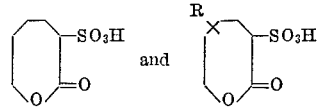

wherein R is lower alkyl, and the metal salts thereof.

2. 2-Sulfo-6-caprolactone.
3. 4-Methyl-2-sulfo-6-caprolactone.
4. Sodium 6-caprolactone-2-sulfonate.
5. Sodium 4-methyl-6-caprolactone-2-sulfonate.
6. A compound of the group consisting of

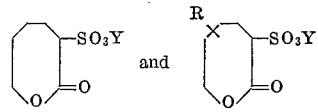

wherein Y is an alkyl or aryl radical and R is lower alkyl.

7. Methyl 6-caprolactone-2-sulfonate.
8. A linear copolyester having a plurality of recurring structural units, from about 90 to about 99.5% of said units being radicals of the formula

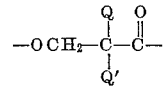

wherein Q and Q' are 1 to 4 carbon atom alkyl groups which when joined form an alicyclic ring and from about 0.5 to 10% of said units being radicals selected from the group consisting of

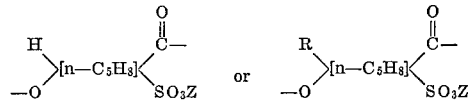

wherein Z is selected from the group consisting of the fraction of an atom of metal equal to the reciprocal of its valence, and an alkyl or aryl radical; R is lower alkyl; the carbonyl and oxy groups are attached at opposite ends of the $C_5H_8$ radical and the $-SO_3Z$ group is attached to the same carbon atom as the carbonyl group.

9. Poly[oxycarbonyl - 1,1 - dimethyldimethylene/oxycarbonyl-1-(sodium sulfo)-pentamethylene], the oxycarbonyl-1,1-dimethyldimethylene units constituting between about 90 and 99.5% of the recurring structural units of the polymer.

10. Poly[oxycarbonyl - 1,1 - dimethyldimethylene/oxycarbonyl-1-(sodium sulfo)-3-methylpentamethylene], the oxycarbonyl-1,1-dimethyldimethylene units constituting between about 90 and 99.5% of the recurring structural units of the polymer.

References Cited

UNITED STATES PATENTS 3,018,272  1/1962  Griffing et al. _____ 260—75

FOREIGN PATENTS 6,401,277  1963  Netherlands.
800,410  11/1950  Germany.

JOSEPH L. SCHOFER, Primary Examiner.

J. C. HAIGHT, Assistant Examiner.

U.S. Cl. X.R.

260—343